(12) United States Patent
Scott et al.

(10) Patent No.: US 7,961,401 B1
(45) Date of Patent: Jun. 14, 2011

(54) SYSTEM FOR PROVIDING TWO POSITION ZOOM-FOCUS

(75) Inventors: Joshua Lynn Scott, Jordan, NY (US); Clark Alexander Bendall, Syracuse, NY (US); Theodore Alexander Chilek, Skaneateles, NY (US)

(73) Assignee: GE Inspection Technologies, LP, Lewistown, PA (US)

( * ) Notice: Subject to any disclaimer, the term of this patent is extended or adjusted under 35 U.S.C. 154(b) by 0 days.

(21) Appl. No.: 12/645,636

(22) Filed: Dec. 23, 2009

(51) Int. Cl.
*G02B 15/14* (2006.01)
(52) U.S. Cl. ....................................................... 359/676
(58) Field of Classification Search .................. 359/676, 359/691, 696, 803, 819, 822, 823; 600/109, 600/168
See application file for complete search history.

(56) References Cited

U.S. PATENT DOCUMENTS

| | | | |
|---|---|---|---|
| 5,418,645 A | 5/1995 | Coath et al. | |
| 5,490,015 A | 2/1996 | Umeyama et al. | |
| 5,655,159 A | 8/1997 | Nakayama et al. | |
| 5,817,014 A | 10/1998 | Hori et al. | |
| 6,113,533 A | 9/2000 | Howes et al. | |
| 6,151,171 A | 11/2000 | Kenin et al. | |
| 7,764,321 B2 * | 7/2010 | Sugimoto | 348/345 |
| 7,778,539 B2 * | 8/2010 | Ito | 396/104 |

* cited by examiner

*Primary Examiner* — Ricky L Mack
*Assistant Examiner* — Tuyen Q Tra
(74) *Attorney, Agent, or Firm* — Global Patent Operation; Mark A. Conkilin (57) ABSTRACT

A system for providing a two-position zoom-focus capability in a video inspection device comprising, in one embodiment, a focus lens cell and primary aperture attached to a set of fixed rails and connected to a zoom lens cell. In one embodiment, the focus lens cell is moveable into a first position along the rails through activation of a proximally located lens movement mechanism, and moveable into a second position through relaxation of a tensioned focus spring. In one embodiment, movement of the focus lens cell between first and second focus positions causes movement of the zoom lens cell and a secondary aperture between corresponding first and second zoom and aperture positions to provide unmagnified and magnified images of a target object.

19 Claims, 5 Drawing Sheets

SYSTEM FOR PROVIDING TWO POSITION ZOOM-FOCUS

BACKGROUND OF THE INVENTION

The subject matter disclosed herein relates generally to video inspection, and more particularly to a two position zoom-focus optical system for video inspection devices.

Video inspection devices, such as video endoscopes, can be used to inspect target objects to identify and analyze flaws and defects in the objects both during and after an inspection. Often times, inspections are performed in small environments such as inside aircraft engines and small pipes. Typically, these environments are poorly illuminated with the only source of light being the endoscope's own light source (e.g., a fiber optic bundle that transmits light from a proximally located lamp, LED or laser, or a distally located lamp or LED). In order for video inspection devices to be effective in maneuvering in these environments, they must be of small diameter, typically less than 10 mm, and exhibit a small distal rigid length, typically less than 20 mm, in order to navigate through locations containing small bending radii. In addition, video inspection devices require versatility in providing wide fields of view, typically up to 120 degrees or greater, in order to provide a more complete view of a target object, while at the same time providing a large depth of field for maintaining a clear image when the inspection device is placed in close proximity to an object. Detailed inspection of objects often requires the ability to observe them from very close distances, typically less than 5 mm. At close distances the illumination light is typically sufficient to produce a bright, high quality image, but a sufficient depth of field is required for viewing 3D objects. Other times, general device navigation and inspection applications require inspectors to view objects from greater distances. When the inspection device is located further away from a given inspection target maintaining sufficient image brightness may be problematic. As such, video inspection devices require an aperture capable of compensating for variable lighting requirements and depths of field as the device is moved closer to or farther from a given inspection target.

Video inspection systems today are typically comprised of a primary optical system exhibiting a fixed, far focused, small field of view on the order of 40 to 50 degrees. The primary optical system provides a large depth of field, highest contrast and brightest image possible for a given endoscope. This arrangement allows for general navigation and distant general inspection of an object of interest, in addition to limited magnification change achievable by pushing the lens system closer to the inspection target within its depth of field. To provide increased magnification at closer focus distances and/or a wider field of view, typically up to 120 degrees, various optical systems can be installed on the forward end of the inspection probe to alter the optical characteristics of the probe and provide a desired field of view and focus distance. These optical systems are often referred to as tips and can be removable. The drawback of this arrangement is that each tip provides a discrete field of view and focus distance change. In addition, the inspector operating the video inspection device is required to pull the probe back out from the inspection site, change the tip, and reinsert the probe if the inspector wishes to change the level of magnification. This can be a time consuming process, and can result in the inspector's inability to relocate the specific site of interest. Alternatively, there are also manually adjustable tips for which the focus can be set prior to inspection. However, such tips can be difficult for the inspector to use since the inspector must know at what distance to focus the tip before using it, and then subsequently be able to accurately set that focus.

Video inspection devices today generally lack an autofocus mechanism and contain optical systems that are designed to have a fixed focal length with a large depth of field that is sufficient to produce adequate image quality over the typical range of inspection distances. Having this fixed focal length results in all but a limited range of probe focus distances not having the best focus, image quality, contrast and resolution possible. In addition, in order to achieve a large depth of field, a small aperture size is commonly utilized, decreasing image brightness and achievable image contrast and resolution. Typically, the aperture is of a fixed size and position, designed both to facilitate a desired depth of field given a particular lens system diameter, and to minimize distortion and other optical aberrations associated with a given lens arrangement, resulting in a fixed F Number. This inherently results in conflicting goals of achieving good image quality within an acceptable depth of field at close inspection distances while providing a clear, bright image at farther inspection distances.

The design of a video inspection system able to perform optical zooming, focus adjustment and aperture variation is constrained, in part, because of space limitations associated with narrow diameter inspection probes, and the inability to place an optical system capable of varying its focal length within the limited space of the probe. Some devices attempt to provide optical zoom and focus adjustment capabilities using costly, complex optical arrangements consisting of numerous lenses and/or motors that are difficult to fit within an endoscope. Although several existing video inspection devices offer a zooming capability, the zoom feature is typically that of a digital zoom, a method limited by the resolution provided by the charged coupled device (CCD) or imager. In digital zoom systems, as the zoom level is increased, the resolution and image quality decreases.

The physical conditions of the typical video inspection environment in which video inspection devices operate require that inspection devices be versatile and rugged. Because of space limitations, the distal end of the video inspection device must be of a fixed rigid length. In addition, the ability to operate the video inspection device in environments up to 80 degrees Celsius, such as a hot engine or turbine, is sometimes necessary and cost effective, as opposed to first waiting for the engine or turbine to cool down before performing the inspection. Finally, because the typical video inspection environment can be an industrial setting that subjects the probe to potential dropping or being struck by other objects, video inspection devices should be mechanically strong enough to endure harsh environments and accidental mishandling.

Conventional zoom and focus systems employed in cameras outside of the video inspection device field are limited in their application to the video inspection field by their size and inability to operate in the extreme environments encountered in the inspection field. It would be advantageous to provide a video inspection device that provides an optical system with at least two zoom-focus positions suitable for use in an endoscopic inspection environment.

BRIEF DESCRIPTION OF THE INVENTION

An optical system for imaging target objects is disclosed, comprising a rail upon which a focus lens cell and a zoom lens cell are moveably mounted, the focus lens cell comprising at least one focus lens and a primary aperture that limits the amount alight incident on the focus lens, wherein the focus lens cell has a first focus position on the rail and a second focus position on the rail, and wherein the first focus position has a different depth of field than the second focus position, the zoom lens cell comprising at least one zoom lens, wherein the zoom lens cell has a first zoom position on the rail and a second zoom position on the rail, wherein the first zoom position has a different magnification than the second zoom position, a secondary aperture proximate the focus lens cell, wherein the secondary aperture is moveable in front of the focus lens cell, wherein the secondary aperture has a first aperture position and a second aperture position, and wherein the first aperture position allows a different amount of light to be incident on the focus lens than the second aperture position, and a lens movement mechanism that causes movement of the focus lens cell axially along the rail, wherein the lens movement mechanism moves the focus lens cell from the second focus position to the first focus position axially along the rail causing movement of the secondary aperture from the second aperture position to the first aperture position and movement of the zoom lens cell from the second zoom position to the first zoom position axially along the rail to change the depth of field, the magnification, and the amount of light incident on the focus lens.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of invention. Thus, for further understanding of the invention, reference can be made to the following detailed description, read in connection with the drawings in which.

DETAILED DESCRIPTION OF THE INVENTION

Figure 1:
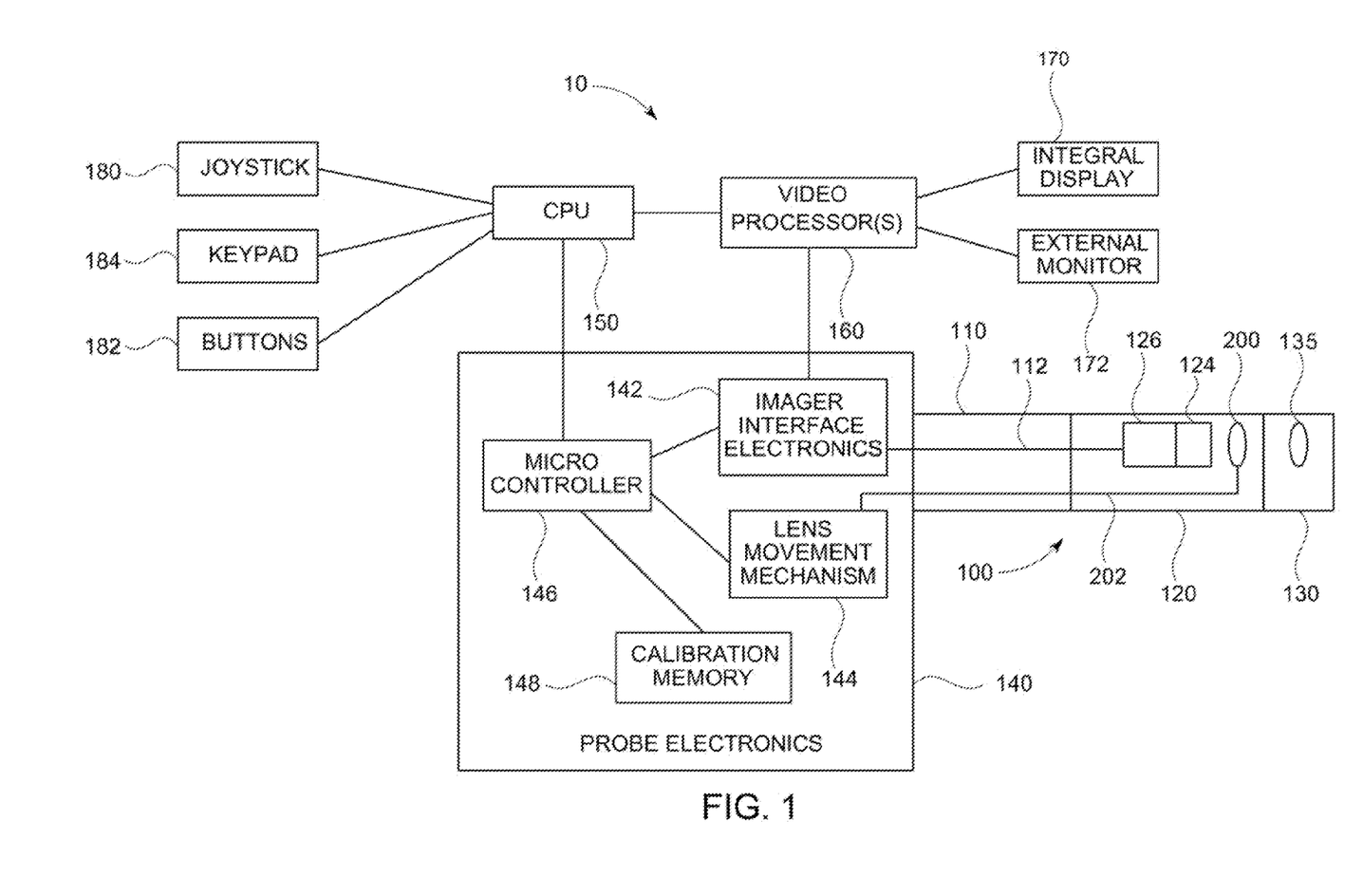
FIG. 1 is a block diagram illustrating an exemplary video inspection device in one embodiment of the invention.

FIG. 1 illustrates an exemplar video inspection device 10 in one embodiment of the invention. Video inspection device 10 can include an elongated probe 100 comprising an insertion tube 110 and a head assembly 120 disposed at the distal end of the insertion tube 110. Insertion tube 110 can be a flexible, tubular section through which all interconnects between the head assembly 120 and probe electronics 140 are passed. Head assembly 120 can include zoom-focus module 200 for guiding and focusing light from the target object onto an imager 124. The imager 124 can be a solid state CCD or CMOS image sensor for obtaining an image of the target object.

A tip 130 can be placed on the distal end of the head assembly 120. The tip 130 can include tip viewing optics 135 (e.g., lenses, windows, or apertures) that work in conjunction with the zoom-focus module 200 to guide and focus light from the target object onto an imager 124. The tip 130 can also include illumination LEDs (not shown) if the source of light for the video inspection device 10 emanates from the tip 130 or a light passing element (not shown) for passing light from the probe 100 to the target object. The tip 130 can also provide the ability for side viewing by including a waveguide (e.g., a prism) to turn the camera view and light output to the side. The elements that can be included in the tip 130 can also be included in the probe 100. Lenses, waveguides and windows in both the probe 100 and tip 130 can be comprised of molded glass, polished glass or polished sapphire.

The imager 124 can include a plurality of pixels formed in a plurality of rows and columns and can generate image signals in the form of analog voltages representative of light incident on each pixel of the imager 124. The image signals can be propagated through imager hybrid 126, which provides electronics for signal buffering and conditioning, to an imager harness 112, which provides wires for control and video signals between the imager hybrid 126 and the imager interface electronics 142. The imager interface electronics 142 can include power supplies, a timing generator for generating imager clock signals, an analog front end for digitizing the imager video output signal, and a digital signal processor for processing the digitized imager video data into a more useful video format.

The imager interface electronics 142 are part of the probe electronics 140, which provide a collection of functions for operating the video inspection device 10. The probe electronics 140 can also include a calibration memory 148, which stores the calibration data for the probe 100 and/or tip 130. The microcontroller 146 can also be included in the probe electronics 140 for communicating with the imager interface electronics 142 to determine and set gain and exposure settings, storing and reading calibration data from the calibration memory 148, controlling the light delivered to the target object, and communicating with the CPU 150 of the video inspection device 10.

In addition to communicating with the microcontroller 146; the imager interface electronics 142 can also communicate with one or more video processors 160. The video processor 160 can receive a video signal from the imager interface electronics 142 and output signals to various monitors, including an integral display 170 or an external monitor 172. The integral display 170 can be an LCD screen built into the video inspection device 10 for displaying various images or data (e.g., the image of the target object, menus, cursors, measurement results) to an inspector. The external monitor 172 can be a video monitor or computer-type monitor connected to the video inspection device 10 for displaying various images or data.

The video processor 160 can provide/receive commands, status information, streaming video, still video images, and graphical overlays to/from the CPU 150 and may be comprised of FPGAs, DSPs, or other processing elements which provide functions such as image capture, image enhancement, graphical overlay merging, distortion correction, frame averaging, scaling, digital zooming, overlaying, merging, flipping, motion detection, and video format conversion and compression.

The CPU 150 can be used to manage the user interface by receiving input via a joystick 180, buttons 182, and/or keypad 184, in addition to providing a host of other functions, including image, video, and audio storage and recall functions, zoom-focus control, system control, and measurement processing. The joystick 180 can be manipulated by the user to perform such operations as menu selection, cursor movement, slider adjustment, movement of the zoom-focus module 200 and articulation control of the probe 100, and may include a push-button function. The buttons 182 and/or keypad 184 also can be used for menu selection and providing user commands to the CPU 150 (e.g., freezing or saving a still video image).

Figure 2:
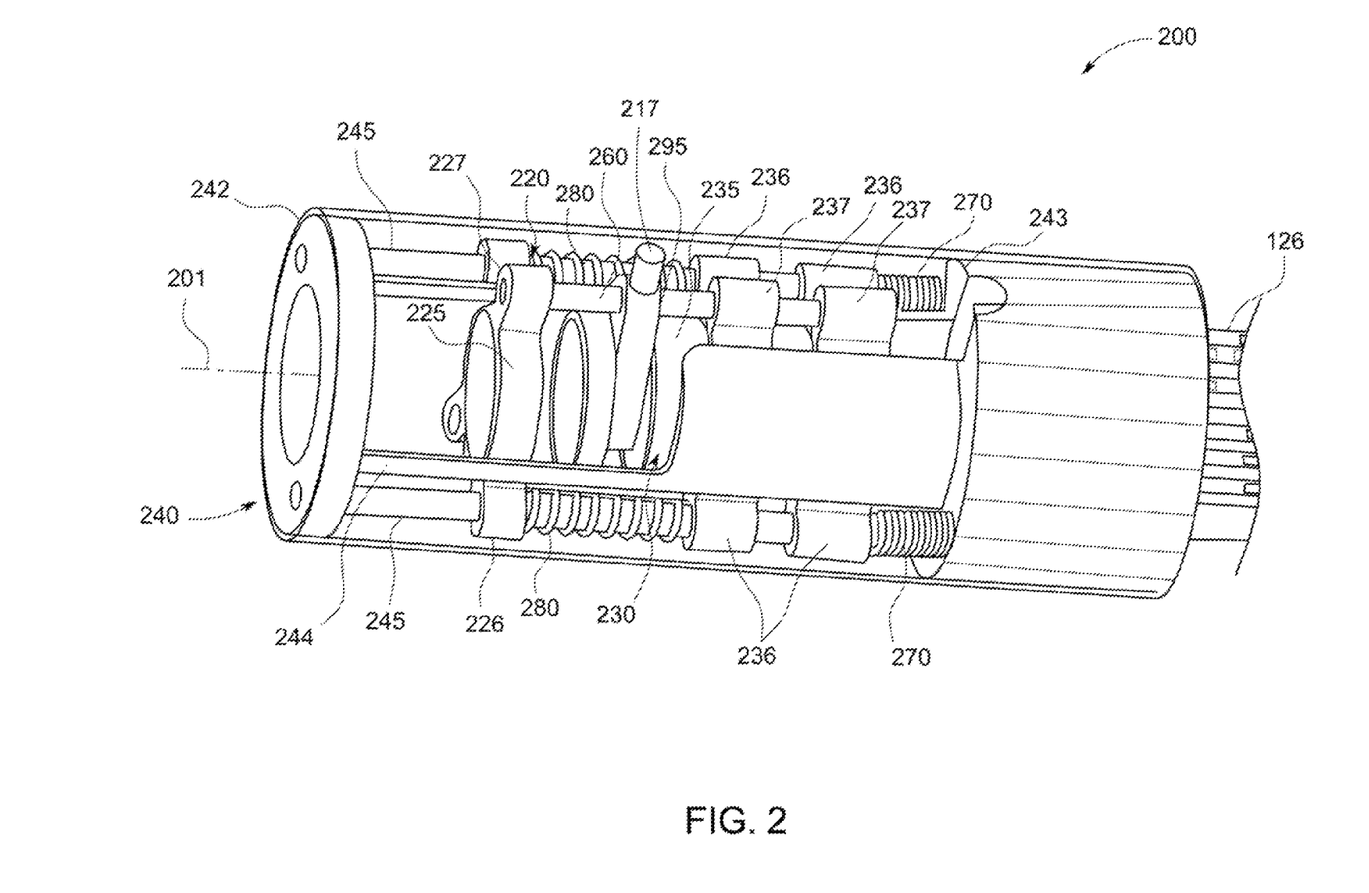
FIG. 2 is an internal perspective view illustrating an exemplary two-position zoom-focus optical system in a first position with the pull block removed in one embodiment of the invention.

FIG. 2 shows an internal perspective view of an exemplary zoom-focus module 200 in one embodiment of the invention. Central axis 201 extends longitudinally through the center of zoom-focus module 200. The zoom-focus module 200 can include a zoom-focus carriage 240 that can have a carriage distal end 242 and a carriage proximal end 243 connected by a frame 244 that provides a rigid structure within which the components of the zoom-focus module 200 can be moveably mounted. Zoom focus carriage 240 can be made of various materials, e.g., stainless steel or a metal alloy. In one embodiment, zoom-focus carriage 240 and frame 244 are constructed from a single piece of material. In addition, at least one rail 245 can extend longitudinally between the proximal end 243 and the distal end 242 substantially parallel to central axis 201. In one embodiment, two or more cylindrically shaped rails 245 can be fixably attached to the zoom-focus carriage 240. A zoom lens cell 220 can be located proximate the carriage distal end 242 and can comprise at least one optical zoom lens 221 (not shown) surrounded by a zoom lens frame 225. Zoom lens frame 225 can be made of various materials, e.g., stainless steel or a metal alloy. Zoom lens cell 220 can be moveably attached to rails 245 by one or more zoom frame arms 226 attached to the outer surface of zoom lens frame 225. In one embodiment, zoom frame arms 226 and zoom lens frame 225 are constructed out of a single piece of material. The rails 245 extend through openings in the zoom frame arms 226 such that zoom lens cell 220 can be moved substantially parallel to central axis 201 along rails 245 to provide an optical zoom capability. Additionally, at least one zoom frame screw arm 227 can be attached to the outer surface of zoom lens frame 225.

Located adjacent the zoom lens cell 220 can be a focus lens cell 230 that can comprise at least one focus lens 231 (not shown) surrounded by a focus lens frame 235. Focus lens frame 235 can be made of various materials, e.g., stainless steel or a metal alloy. In one embodiment, focus lens cell 230 can be located proximate the zoom lens cell 220. Focus lens cell 230 can be moveably attached to rail 245 by at least one focus frame rail arm 236 that can be attached to the outer surface of focus lens frame 235. In one embodiment, two or more pairs of longitudinally aligned and spaced apart focus frame rail arms 236 attach the focus lens cell 230 to two or more rails 245. Rails 245 extend parallel to the focus lens cell 220 through openings in the focus frame rail arms 236 such that focus lens cell 230 can be moved longitudinally along central axis 201 along rails 245 in relation to the fixed, proximally located imager 124 to provide an optical focus capability. Additionally, at least one focus frame screw arm 237 having a threaded opening can be attached to the outer surface of focus lens frame 235.

In one embodiment, at least one longitudinally aligned zoom adjustment screw 260 extends substantially parallel to central axis 201 along the outer surface of focus lens cell 220 through the threaded openings in at least one focus frame screw arm 237 such that the distal end of the zoom adjustment screw 260 can be advanced past the distal end of the focus lens cell 230 towards the zoom lens cell 220 and into zoom frame screw arms 227 to interconnect zoom lens cell 220 with focus lens cell 230. Zoom lens cell 220 can slide either proximally or distally along zoom adjustment screw 260, but cannot extend beyond the distal end of zoom adjustment screw 260. Zoom adjustment screws 260 also allow for adjustment and calibration of the focus and zoom positions during manufacture to accommodate various lens and part tolerances.

Figure 3:
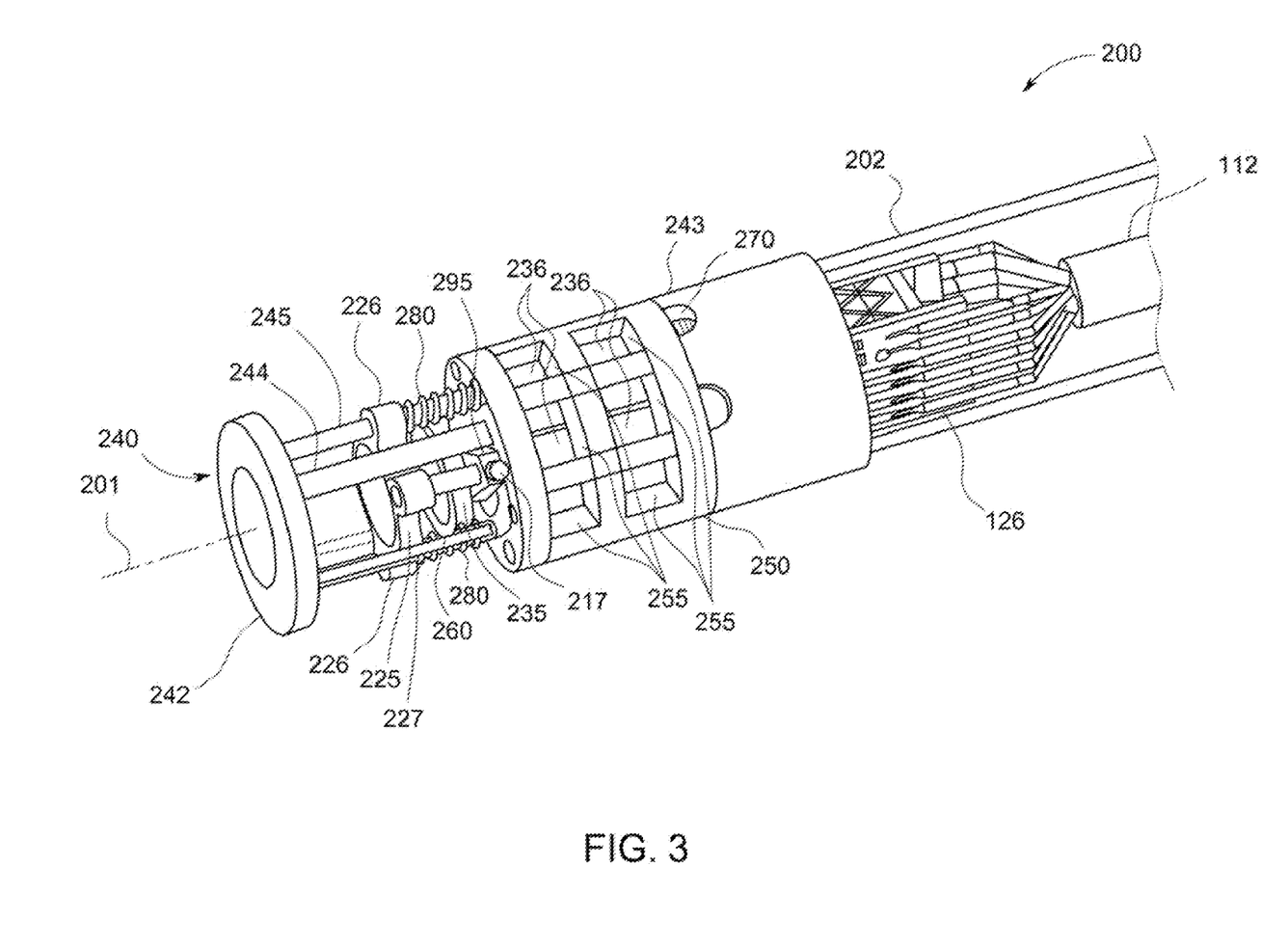
FIG. 3 is an internal perspective view illustrating an exemplary two-position zoom-focus optical system in a first position with the pull block installed in one embodiment of the invention.

FIG. 3 is an internal perspective view illustrating an exemplary two-position zoom-focus optical system in a first position with the pull block installed in one embodiment of the invention. As shown in FIG. 3, surrounding the focus lens cell 230 can be one or more cylindrical pull blocks 250. Pull block 250 surrounds the focus lens cell 230 and can have a hollow internal cavity shaped to accommodate the focus lens cell 230 and the frame 244. Additionally, indentations on the interior surface of pull block 250 allow the pull block 250 to slide over and along rails 245. One or more openings 255 extending through the lateral sides of pull block 250 allow the focus frame rail arms 236 to frictionally engage with the pull block 250 and interconnect the focus lens cell 230 with the pull block 250. The distal ends of lens control cables 202 can be terminated in the pull block 250. Accordingly, because of the engagement between pull block 250 and focus lens cell 230, movement of the lens control cables 202 distally or proximally moves both the pull block 250 and the focus lens cell 230 distally or proximally along rails 245.

Figure 4:
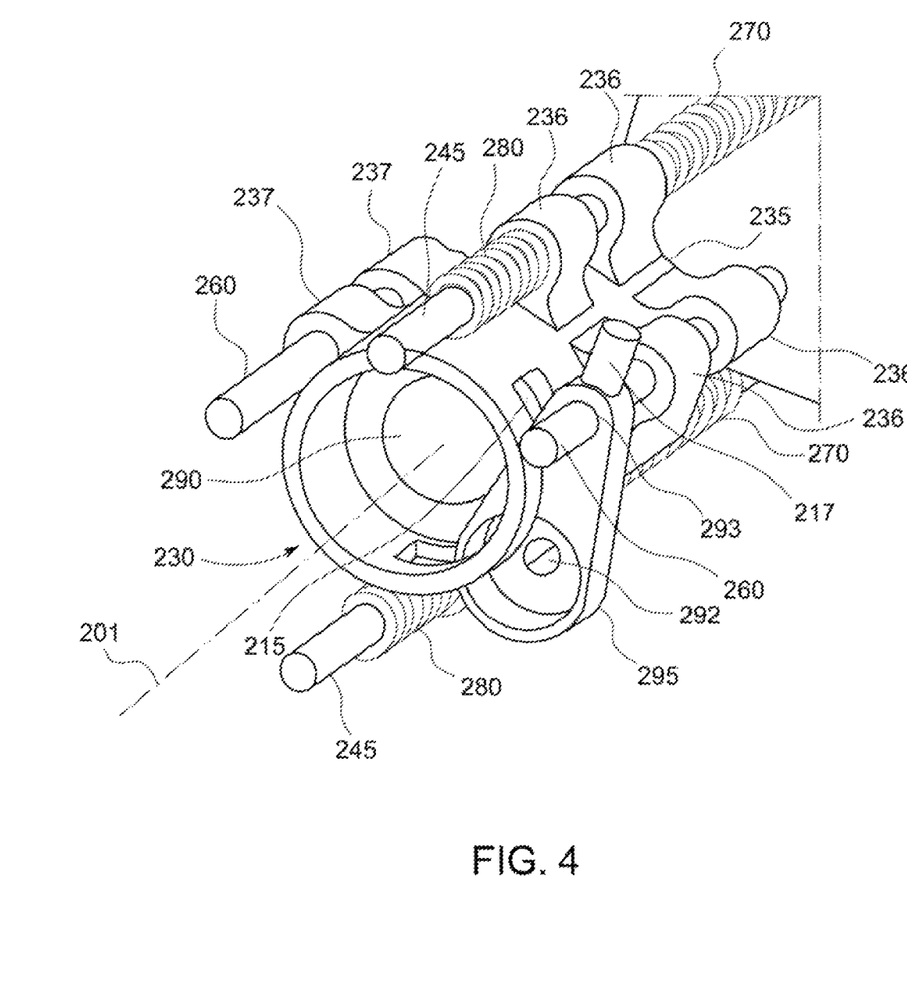
FIG. 4 is a perspective view of an exemplary focus lens cell illustrating the primary aperture and the secondary aperture in one embodiment of the invention.

FIG. 4 is a perspective view of an exemplary focus lens cell illustrating the primary aperture and the secondary aperture in one embodiment of the invention. With reference to FIG. 4, located distally along central axis 201 from the focus lens 231 (not shown) can be a primary aperture 290. The center of primary aperture 290 can be aligned with central axis 201. In one embodiment, primary aperture 290 can be part of the focus lens cell 230. Primary aperture 290 allows a predetermined amount of light to be incident on the focus lens 231 from the zoom lens cell 220. Located distally from the primary aperture 290 in the focus lens frame 235 can be a secondary aperture slot 215 that comprises an opening extending through the side of the focus lens frame 235. Also located distally from the primary aperture 290 can be secondary aperture arm 295 having a secondary aperture 292 extending through a first end and a pivot hole 293 extending through a second end. A zoom adjustment screw 260 passes through the pivot hole 293 such that the secondary aperture arm 295 can be free to pivot substantially perpendicular to and around the zoom adjustment screw 260 through the secondary aperture slot 215 in focus lens frame 235 and in front of primary aperture 290. When pivoted in front of primary aperture 290, the center of secondary aperture 292 can be substantially aligned with central axis 201. In one embodiment, secondary aperture 292 can be smaller than the primary aperture 290, thereby further limiting the amount of light incident on the focus lens cell 230 from the zoom lens cell 220 when pivoted in front of primary aperture 290 along central axis 201. Extending outwardly from the end of the secondary aperture arm 295 attached to the zoom adjustment screw 260 can be an aperture pivot pin 217. Because the focus lens cell 230, primary aperture 290, secondary aperture 292 and zoom adjustment screws 260 are all interconnected, movement of the lens control cables 202 causes all of these components to move in unison substantially parallel to central axis 201 along rails 245.

Figure 5:
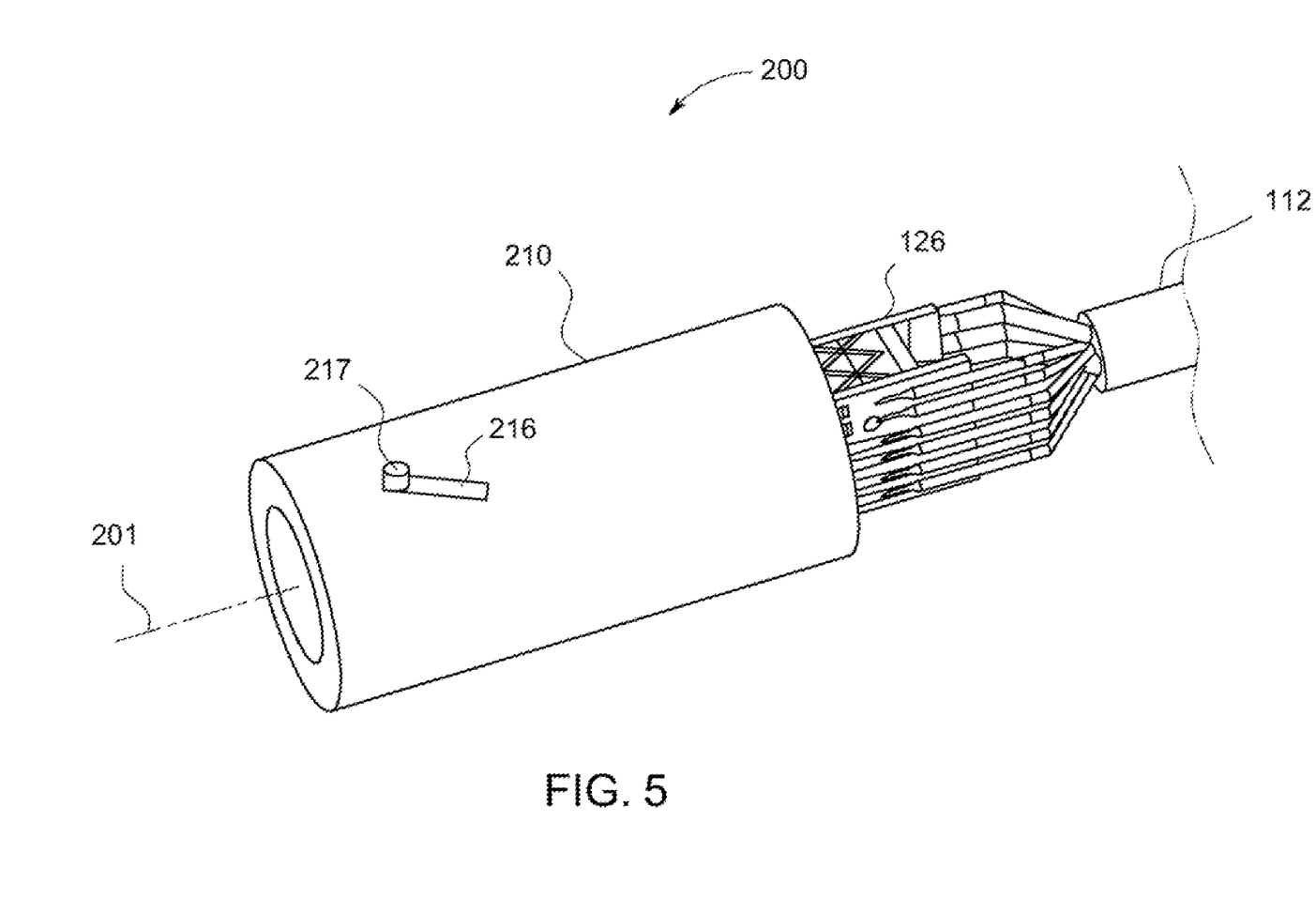
FIG. 5 is an internal perspective view illustrating an exemplary two-position zoom-focus optical system in a second position with the pull block removed in one embodiment of the invention.

FIG. 5 is an internal perspective view illustrating an exemplary two-position zoom-focus optical system in a second position with the pull block removed in one embodiment of the invention. With reference to FIG. 5, encasing the zoom-focus module 200 can be a zoom-focus module outer shell 210. Zoom-focus module outer shell 210 can be made of various materials, e.g., stainless steel, metal alloys or plastic, and provides protection to the components of the zoom-focus module 200 from the hazards of the inspection environment. Some embodiments may include an additional outer shell that surrounds the zoom-focus module outer shell 210. This additional outer shell can contain a sealed distal window, thereby preventing liquids from entering the zoom module 200, and the distal end of the additional outer shell can be threaded to accommodate various tip attachments. Located near the distal end of the zoom-focus module outer shell 210 can be aperture cam slot 216. Aperture cam slot 216 can be a narrow opening in the zoom-focus module outer shell 210 that extends along the zoom-focus module outer shell 210 in a direction that can be skewed with regard to the central axis 201 of the zoom-focus module 200. When assembled, aperture pivot pin 217 extends through aperture cam slot 216 such that movement of the focus lens cell 230 along the central axis 201 within the zoom-focus module 200 causes the aperture pivot pin 217 to slide within aperture cam slot 216, pivoting the secondary aperture arm 295 around the zoom adjustment screw 260. When the aperture pivot pin 217 is located at the proximal end of aperture cam slot 216, the secondary aperture 292 can be pivoted into alignment with central axis 201 in front of the primary aperture 290 and into a first aperture position. When the aperture pivot pin 217 is located at the distal end of aperture cam slot 216, the secondary aperture 292 can be pivoted away from the central axis 201 and towards the inner wall of zoom-focus module outer shell 210 into a second aperture position.

With reference again to FIGS. 1 through 4, positioned around rails 245 between the most distally located focus frame rail arm 236 and the zoom frame arm 226 can be at least one zoom spring 280. In one embodiment, a zoom spring 280 can be located around each of two rails 245. Located between the proximal end of focus lens cell 230 and the imager 124, around rails 245 between the most proximal focus frame rail arm 236 and the proximal end 243 of the zoom-focus carriage 240, can be at least one focus spring 270. In one embodiment, a focus spring 270 can be located around each of two rails 245. In one embodiment, when the focus lens cell 230 is moved distally within the zoom-focus module 200, zoom springs 280 can be compressed and focus springs 270 can be relaxed. Accordingly, in this embodiment, when the focus lens cell 230 is moved proximally within the zoom-focus module 200, zoom springs 280 can be relaxed and focus springs 270 can be compressed.

In one embodiment, lens movement mechanism 144 can be attached to the proximal end of lens control cable 202, and can be actuated to apply tension to and move the lens control cable 202 proximally a predetermined distance within the zoom-focus module 200 along the central axis 201 to achieve a first predetermined zoom-focus position, or distally a predetermined distance to achieve a predetermined second zoom-focus position. In one embodiment, lens movement mechanism 144 can be an electric motor. In other embodiments, lens movement mechanism 144 can be a pneumatic actuator or solenoid. By moving the lens control cable 202 proximally, tension can be created in the lens control cable 202 that can be greater than the distally directed force exerted by the focus springs 270, thereby pulling the focus lens cell 230 towards the carriage proximal end 243 and compressing the focus springs 270. Additionally, aperture pivot pin 217 can move proximally along the aperture cam slot 216, pivoting secondary aperture 295 from the second aperture position into the first aperture position in front of primary aperture 290. Decompression of the zoom springs 280 as the focus lens cell 230 moves proximally can force the zoom lens cell 220 from a first zoom position in which the proximal end of zoom lens cell 220 can be pressed against the distal end of focus lens cell 230 distally along the central axis 201 to a second zoom position in which the zoom lens cell 220 can be moved distally from the distal end of focus lens cell 230 a distance determined by the distal end of the zoom adjustment screws 260.

With these movements, a first zoom-focus position can be achieved, namely the focus lens cell 230 has been moved to a first focus position in a proximate location along central axis 201 within zoom-focus module 200, the secondary aperture 295 can be pivoted into a first aperture position in front of primary aperture 290, and the zoom lens cell 220 has moved a predetermined distance distally away from the focus lens cell 230 into a first zoom position. Additionally, because the zoom lens cell 220 is attached to the focus lens cell 230 by zoom adjustment screws 260, the zoom lens cell 220 has moved a predetermined distance proximally along central axis 201, despite being moved distally from the distal end of the focus lens cell 230.

In one embodiment, in the first zoom-focus position, zoom-focus module 200 can provide a magnified image of a target object utilizing a smaller secondary aperture 292, thereby limiting the amount of light incident on the focus lens 231. In doing so, the locations of the focus lens cell 230 and zoom lens cell 220 within the zoom-focus module 200 can be predetermined such that the system has a small depth of field to produce a focused, magnified image of a target object on the imager 124. However, it will be understood by those of skill in the art that different embodiments having different arrangements of optical components could employ a similar movement to produce the opposite results, namely the locations of the focus lens cell 230 and zoom lens cell 220 within the zoom-focus module 200 can be predetermined such that the system has a large depth of field to produce a focused, unmagnified image of a target object on the imager 124.

In one embodiment, deactivation of the lens movement mechanism 144 can relax the tension in lens control cables 202 and move the focus lens cell 230 distally, achieving a second zoom-focus position. Decompression of focus springs 270 resulting from deactivation of lens movement mechanism 144 can push the focus lens cell 230 distally, along with zoom adjustment screws 260. Movement of zoom adjustment screws 260 distally causes movement of the zoom lens cell 220 distally from the first zoom position until the distal end of the zoom lens cell 220 comes into contact with the distal end 242 of zoom-focus carriage 240 to define a second zoom position. The amount of force required to compress zoom springs 280 can be less than that exerted by the decompression of the focus springs 270, and the focus lens cell 230 continues to move distally, compressing the zoom springs 280 and stopping when the distal end of the focus lens cell 230 comes into contact with the proximal end of the zoom lens cell 220. Additionally, aperture pivot pin 217 can move distally along the aperture cam slot 216 pivoting secondary aperture 292 from the first aperture position away from primary aperture 290 into the second aperture position. With these movements, a second zoom-focus position can be achieved, namely the focus lens cell 230 has been moved distally from the first focus position into the second focus position such that the distal end of focus lens cell 230 can be compressed against the proximal end of zoom lens cell 220 along central axis 201, the secondary aperture 292 can be rotated from the first aperture position to the second aperture position away from primary aperture 290, and the zoom lens cell 220 has moved from the first zoom position to the second zoom position such that the distal end of the zoom lens cell 220 can be in contact with the distal end 242 of the zoom-focus carriage 240.

In one embodiment, in the second zoom-focus position, zoom-focus module 200 can produce a bright, unmagnified image of a target object utilizing a larger primary aperture 290, thereby increasing the amount of light incident on the focus lens 231. In doing so, the locations of the focus lens cell 230 and zoom lens cell 220 within the zoom-focus module 200 can be predetermined such that the system has a large depth of field to produce a focused, bright, unmagnified image of a target object on the imager 124. However, it will be understood by those of skill in the art that different embodiments having different arrangements of optical components could employ a similar movement to produce the opposite results, namely the locations of the focus lens cell 230 and zoom lens cell 220 within the zoom-focus module 200 can be predetermined such that the system has a small depth of field to produce a focused, magnified image of a target object on the imager 124.

Locating the lens movement mechanism 144 outside of the zoom-focus module 200 can provide additional space within the zoom-focus module 200, thereby allowing the use of larger, simpler, more reliable and cost-effective mechanics for providing a two-position zoom-focus capability. Additionally, embodiments utilizing a spring or other resilient device to achieve the second zoom-focus position can eliminate the need for an additional lens movement mechanism. This approach not only can improve the reliability and durability of the optical system by allowing larger, less complicated mechanics, electronics and optics: but can also reduce cost.

Although the exemplary embodiments described herein all place the focus lens cell 230 proximate to the zoom lens cell 220, it is understood that one of skill within the art would be able to design alternative embodiments in which the design and configuration of the various components of the optical system, including but not limited to the zoom lens cell 220, the focus lens cell 230, the primary aperture 290, and the secondary aperture 292, could be rearranged while producing the same optical effect.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An optical system for imaging target objects, comprising:
   a rail upon which a focus lens cell and a zoom lens cell are moveably mounted;
   said focus lens cell comprising at least one focus lens and a primary aperture that limits the amount of light incident on said focus lens, wherein said focus lens cell has a first focus position on said rail and a second focus position on said rail, and wherein said first focus position has a different depth of field than said second focus position;
   said zoom lens cell comprising at least one zoom lens, wherein said zoom lens cell has a first zoom position on said rail and a second zoom position on said rail, wherein said first zoom position has a different magnification than said second zoom position;
   a secondary aperture proximate said focus lens cell, wherein said secondary aperture is moveable in front of said focus lens cell, wherein said secondary aperture has a first aperture position and a second aperture position, and wherein said first aperture position allows a different amount of light to be incident on said focus lens than said second aperture position; and
   a lens movement mechanism that causes movement of said focus lens cell axially along said rail;
   wherein said lens movement mechanism moves said focus lens cell from said second focus position to said first focus position axially along said rail causing movement of said secondary aperture from said second aperture position to said first aperture position and movement of said zoom lens cell from said second zoom position to said first zoom position axially along said rail to change said depth of field, said magnification, and said amount of light incident on said focus lens.

2. The optical system of claim 1, further comprising a focus spring, wherein said focus spring causes movement of said focus lens cell from said first focus position to said second focus position axially along said rail, causing movement of said secondary aperture from said first aperture position to said second aperture position and movement of said zoom lens cell from said first zoom position to said second zoom position axially along said rail to change said depth of field, said magnification, and said amount of light incident on said focus lens.

3. The optical system of claim 2, said optical system further comprising:
   a zoom adjustment screw that connects said focus lens cell and said zoom lens cell; and
   a zoom spring located between said focus lens cell and said zoom lens cell, wherein said movement of said zoom lens cell from said first zoom position to said second zoom position is caused by said zoom spring and by said movement of said focus lens cell from said first focus position to said second focus position.

4. The optical system of claim 2, wherein said depth of field in said first focus position is smaller than said depth of field in said second focus position.

5. The optical system of claim 2, wherein said magnification in said first zoom position is greater than said magnification is said second zoom position.

6. The optical system of claim 2, wherein said amount of light incident on said focus lens in said first aperture position is less than said amount of light incident on said focus lens in said second aperture position.

7. The optical system of claim 1, wherein said lens movement mechanism comprises an electric motor.

8. The optical system of claim 7, wherein said lens movement mechanism further causes movement of said focus lens cell from said first focus position to said second focus position axially along said rail, causing movement of said secondary aperture from said first aperture position to said second aperture position and movement of said zoom lens cell from said first zoom position to said second zoom position axially along said rail to change said depth of field, said magnification, and said amount of light incident on said focus lens.

9. The optical system of claim 1, wherein said lens movement mechanism comprises a pneumatic actuator.

10. The optical system of claim 9, wherein said lens movement mechanism further causes movement of said focus lens cell from said first focus position to said second focus position axially along said rail, causing movement of said secondary aperture from said first aperture position to said second aperture position and movement of said zoom lens cell from said first zoom position to said second zoom position axially along said rail to change said depth of field, said magnification, and said amount of light incident on said focus lens.

11. The optical system of claim 1, wherein said lens movement mechanism comprises a solenoid.

12. The optical system of claim 11, wherein said lens movement mechanism further causes movement of said focus lens cell from said first focus position to said second focus position axially along said rail, causing movement of said secondary aperture from said first aperture position to said second aperture position and movement of said zoom lens cell from said first zoom position to said second zoom position axially along said rail to change said depth of field, said magnification, and said amount of light incident on said focus lens.

13. The optical system of claim 1, said optical system further comprising:
   a zoom adjustment screw that connects said focus lens cell and said zoom lens cell; and
   a zoom spring located between said focus lens cell and said zoom lens cell, wherein said movement of said zoom lens cell from said second zoom position to said first zoom position is caused by said zoom spring and by said movement of said focus lens cell from said second focus position to said first focus position.

14. The optical system of claim 1, said optical system further comprising a zoom-focus module outer shell having an aperture cam slot, and said secondary aperture further comprises an aperture pivot pin, wherein movement of said aperture pivot pin along said aperture cam slot causes said secondary aperture to move between said first and second aperture positions.

15. The optical system of claim 1, further comprising a secondary aperture slot in said focus lens cell, wherein said movement of said secondary aperture from said second position to said first position is a rotation of said secondary aperture through said secondary aperture slot.

16. The optical system of claim 1, wherein said depth of field in said first focus position is smaller than said depth of field in said second focus position.

17. The optical system of claim 1, wherein said magnification in said first zoom position is greater than said magnification is said second zoom position.

18. The optical system of claim 1, wherein said amount of light incident on said focus lens in said first aperture position is less than said amount of light incident on said focus lens in said second aperture position.

19. The optical system of claim 1, wherein said primary aperture is larger than said secondary aperture.

* * * * *